United States Patent [19]

Null

[11] Patent Number: 5,622,241

[45] Date of Patent: Apr. 22, 1997

[54] TRAILER BRAKE SYSTEM WITH MULTIPLE POINT CALIPER UNIT MOUNTING

[76] Inventor: Robert L. Null, 2868 State Rte. 378, Willow Wood, Ohio 45696

[21] Appl. No.: 527,244

[22] Filed: Sep. 12, 1995

[51] Int. Cl.[6] ................................................ B60T 7/20
[52] U.S. Cl. .................. 188/73.42; 188/73.43; 188/73.45; 188/112 R
[58] Field of Search .................... 188/73.42, 73.43, 188/112 R, 73.45, 73.44, 3 H, 3 R; 303/7

[56] References Cited

U.S. PATENT DOCUMENTS

| | | |
|---|---|---|
| 3,365,028 | 1/1968 | Hajek . |
| 3,746,132 | 7/1973 | Jewell, Jr. . |
| 3,754,623 | 8/1973 | Gatt . |
| 3,973,655 | 8/1976 | Mollard . |
| 4,267,903 | 5/1981 | Kita et al. . |
| 4,781,273 | 11/1988 | Fujinami ........................ 188/73.42 |
| 5,316,110 | 5/1994 | Null . |
| 5,411,120 | 5/1995 | Null . |

FOREIGN PATENT DOCUMENTS

| | | |
|---|---|---|
| 228812A | 7/1987 | European Pat. Off. . |
| 3221320A | 12/1983 | Germany . |

*Primary Examiner*—Douglas C. Butler
*Attorney, Agent, or Firm*—King and Schickli

[57] ABSTRACT

A trailer brake system provides an improved disc brake assembly with a caliper unit that includes a housing for mounting the pads for relative movement toward and away from the rotor and a cradle with spaced guide pins/tracks for securely supporting the housing at multiple, spaced points. The cradle includes a yoke having spaced arms and a cross piece for embracing the housing, and is independently mounted on a single pivot pin. First and second stops are provided on the bracket for engagement with the cross piece to limit the pivot movement of the caliper unit during vehicle backing and forward movement, respectively. Guide apertures are provided adjacent the distal end of the respective arms of the yoke and include an elastomeric bushing around the guide pins for cushioned in and out movement. The spaced guide tracks on the housing assist in providing axial stability. An elastomeric spring formed integrally with the bushing bodily centers the housing in the axial direction during the non-braking modes and provides added cushion effect. An elastomeric bumper at the first stop urges the caliper unit towards the second stop to prevent pressure release during vehicle forward movement, including in the braking mode. An improved relief valve feeds/exhausts a common transfer line to the cylinder in the housing of the caliper unit.

20 Claims, 4 Drawing Sheets

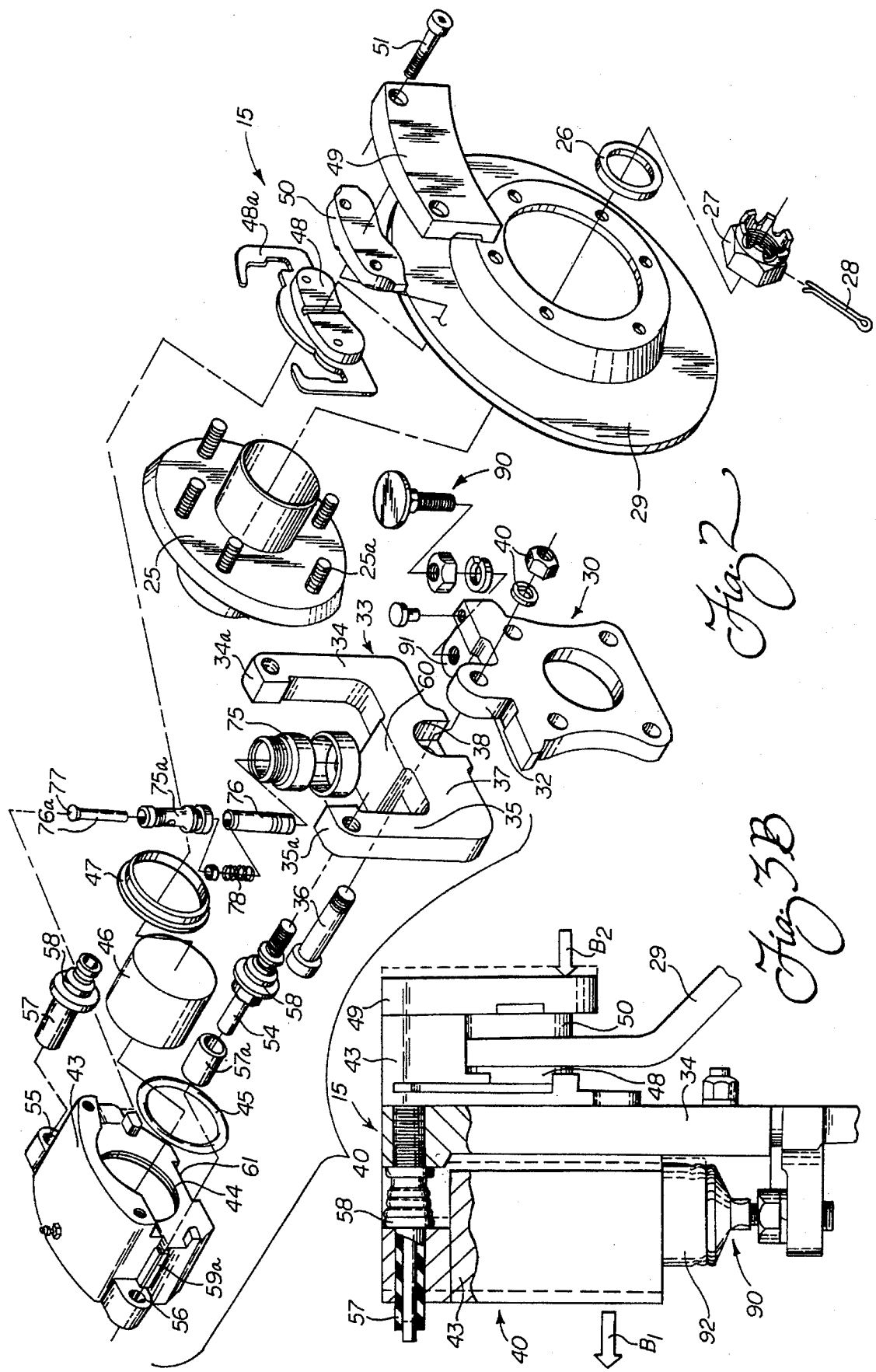

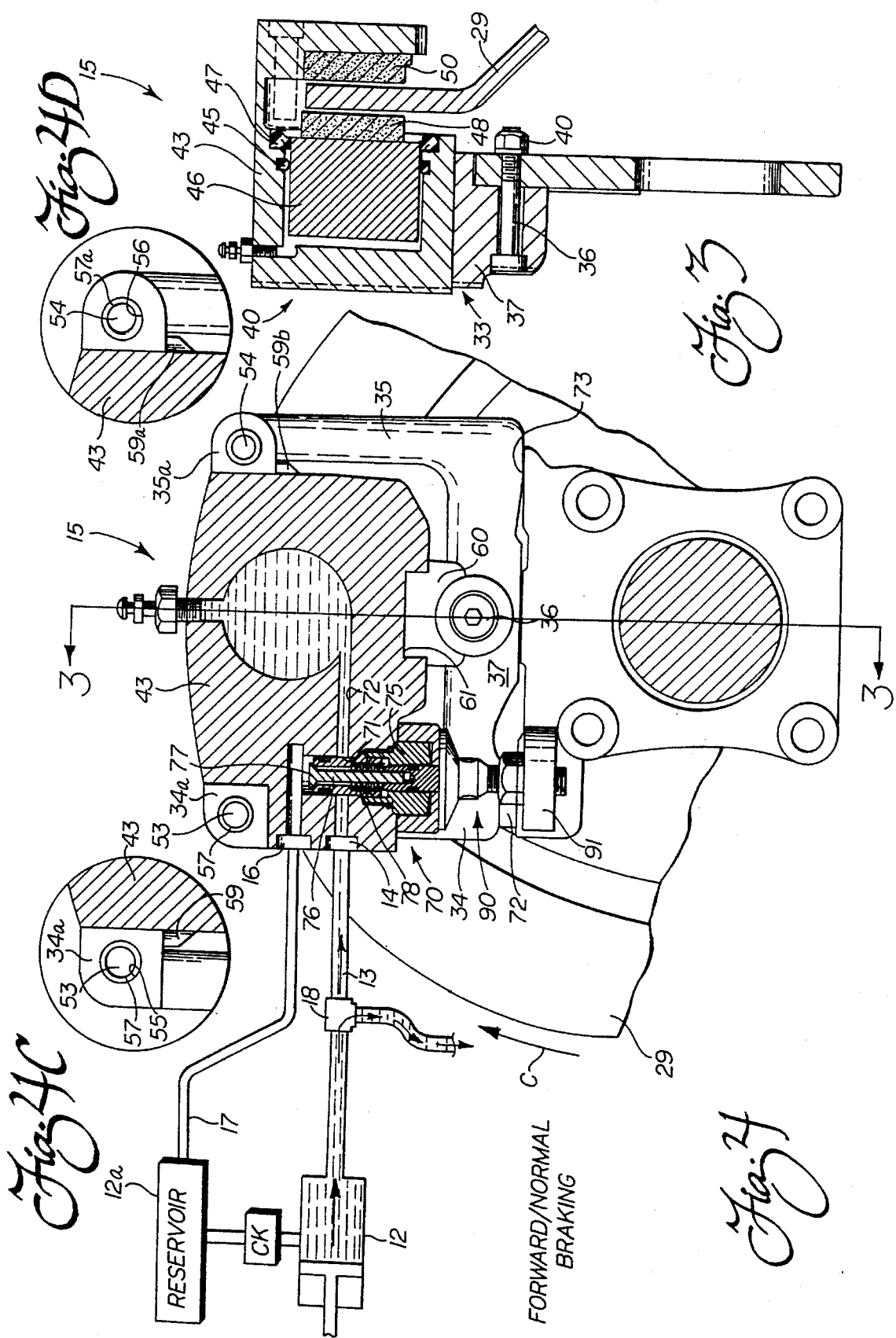

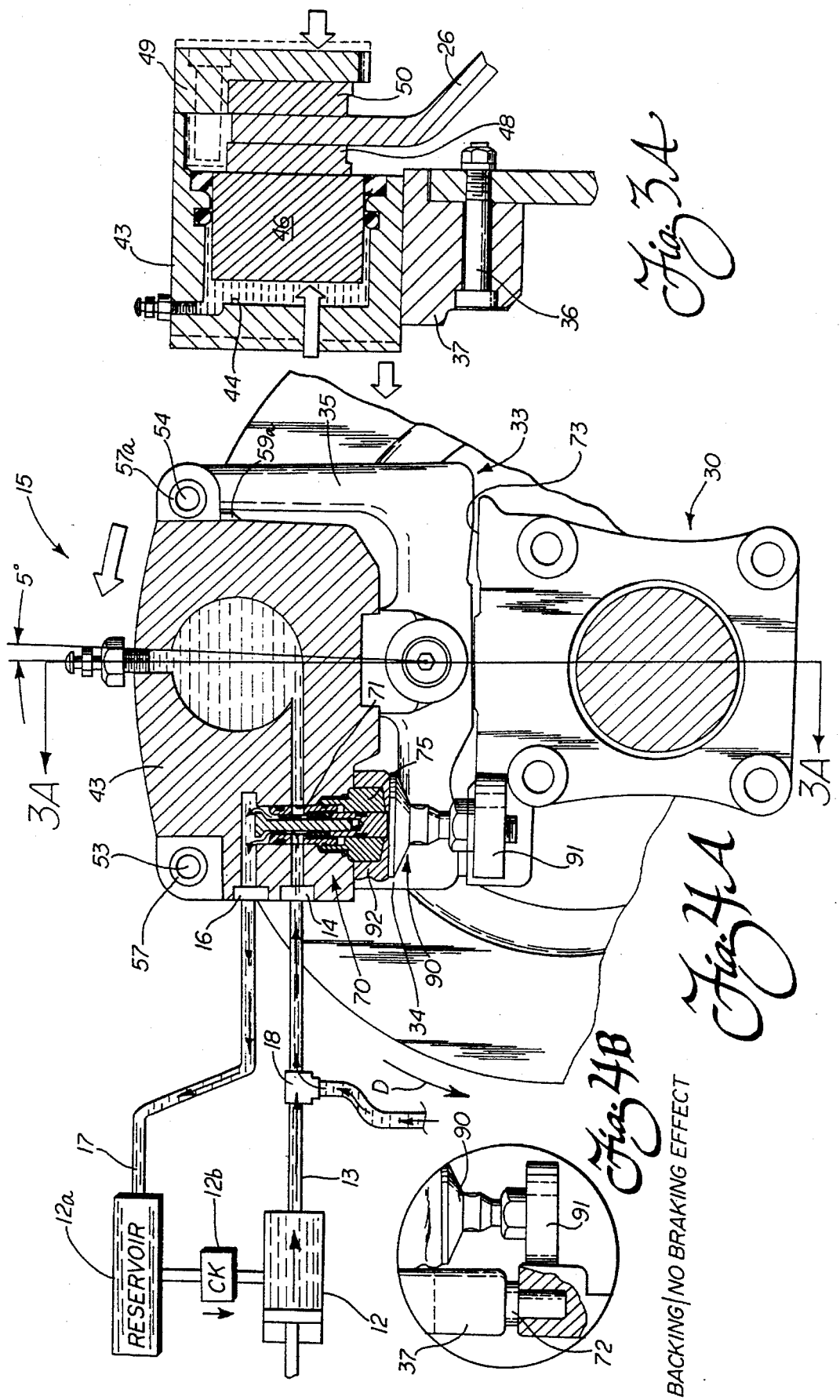

TRAILER BRAKE SYSTEM WITH MULTIPLE POINT CALIPER UNIT MOUNTING

TECHNICAL FIELD

The present invention relates generally to disc brake systems for a trailer or other towed vehicle; and more particularly, to a brake unit including a disc brake assembly providing for improved efficiency of braking during forward movement, as well as improved automatic release upon backing.

BACKGROUND OF THE INVENTION

In the field of braking systems for the wheels of a towed vehicle, such as a trailer, there have been many systems proposed. While similar to standard braking systems on automobiles, the systems are different in that the manner of activation and release is not the same. While technical advances have been made for the automotive systems in the past, up until just recently very little change has been made in trailer braking systems. Indeed, with increased highway traffic safety regulations becoming more prevalent and stringent, improved braking for trailers is an absolute requirement. The successful system that has recently brought about the revolution in trailer brake systems is illustrated in my prior U.S. patents entitled "Trailer Brake System With Release Apparatus", U.S. Pat. Nos. 5,316,110 and 5,411,120, issued on May 31, 1994 and May 2, 1995, respectively.

Today, Null's free backing disc brake systems represented by these patents is in widespread, successful use. It is proven in extensive testing and commercial use to be highly efficient and very reliable in performance. Users have found that the performance increase in this disc brake system, especially on relatively light weight utility and boat trailers, is outstanding. As a consequence, stopping distances are significantly reduced with the Null's brake system so as to meet and exceed all federal and local requirements.

Thus, while the basic Null's brake system, including the innovative individual brake units, as used both for the master and the slave or follower units in the system, have been very successful, further improvement is desirable for meeting specific applications. While the original system was designed for relatively lightweight utility/boat trailers, there is now extremely high interest in the industry to expand the basic brake system and brake unit, as represented in the '110 and the '120 patents to accommodate larger trailers, greater axle loads and performance driving applications. In particular, fleet owners, primarily in the rental utility trailer market, are interested in a new design that provides even more efficiency in braking in the same flawless operation as before, so that the Null's system can accommodate the entire range of standard trailers, axle loading and driving conditions. That is, it is now appropriate since the basic concept is proven, to provide an improved design using the same operative principles, but which is better adapted to increased braking loads. For example, it is desirable from a commercial point of view to be able to accommodate heavier axle loads, such as 3,500 pounds GWVR, and even into the 7,000 and 10,000 pounds GWVR range. However, the need is equally critical for a system that easily withstands rapid or panic stops from the increased highway speeds of today.

SUMMARY OF THE INVENTION lIt is accordingly a primary object of the present invention to extend the basic concept of my prior disc brake system so as to provide higher braking efficiency and increased operating capacity including for trailers with heavier axle loading.

It is an important object of the present invention to provide a braking system utilizing a disc brake assembly characterized by multiple point mounting in the caliper unit to better withstand the increased forces of braking.

It is another object of the present invention to provide a disc brake system for a trailer wherein the housing of the caliper unit is supported on a cradle that incorporates guides to provide controlled axial movement as the pads engage the disc during the braking mode, and an independent pivot mounting for the cradle as the caliper unit moves in response to rotor movement upon backing.

It is still another object of the present invention to provide a brake unit of the type described wherein the force of braking is taken by multiple points between the caliper housing and the support cradle, thus providing for efficient and reliable operation under heavier loading of the trailers with larger axle capacity.

It is still another object of the present invention to provide a disc brake assembly for a braking system for a trailer that isolates the axial movement of the housing of the caliper unit to accommodate in and out movement of the braking pads from the pivoting movement of the caliper unit required to allow release of the pressure against the pads upon backing.

Still another object of the present invention is to provide a disc brake assembly for a trailer or other towed vehicle utilizing an improved mounting arrangement for the caliper unit that involves a cradle having multiple guide points for the housing to provide smooth, reliable in and out movement during activation of the brake pads, and a single pivot pin spaced from the multiple points for mounting the caliper unit, including the cradle, for pivotal action to release the braking force upon backing.

Additional objects, advantages and other novel features of the invention will be set forth in part in the description that follows and in part will become apparent to those skilled in the art upon examination of the following or may be learned with the-practice of the invention. The objects and advantages of the invention may be realized and obtained by means of the instrumentalities and combinations particularly pointed out in the appended claims.

To achieve the foregoing and other objects, and in accordance with the purposes of the present invention as described herein, a braking system including a disc brake assembly for a trailer or other towed vehicle is provided that incorporates improvements over my prior systems, such as illustrated in the '110 and the '120 issued U.S. Patents. An important improvement of the present invention is in providing a modification that allows for better distribution of the braking load, especially with larger capacity trailers, so as to provide the same overall superior performance of the Null's braking system, but at the same time to maintain the overall cost of manufacturing and maintenance very low compared to previous systems. As in my previous design, each brake unit of the system, including the hydraulic operating means, is self contained and performs the operation of braking in a unique manner. While the distribution of the load is an advance in the art, other key improvements are also of substantial interest with respect to the present invention.

A stationary mounting bracket of each brake unit attaches to the axle of the vehicle. The bracket supports a caliper unit including a housing for mounting of the pads that are moved toward and away from the rotor attached to the wheel of the vehicle, and thus into and out of engagement with the rotor for braking/non-braking, respectively. As in my previous design, a brake cylinder in the housing positions a piston for engagement with at least one of the brake pads to provide the relative movement for gripping the rotor and thus providing the braking action.

In accordance with the present invention, the distribution of the braking load within the caliper unit is provided by a cradle having multiple contact points. Located at these points are guide means that accommodate the axial movement of the caliper housing in response to the relative movement of the pads during braking. The guide means assure that the housing moves smoothly within the cradle even under the increased loading provided by larger and heavier trailers and by more severe braking, such as provided by higher performance vehicles and increased speed. The end result of this feature is to provide not only a more responsive braking action, but also a system that is very reliable. By spreading the load between a number of guide points between the housing and the cradle, the stress on any one part or portion of the caliper unit is substantially reduced. The minimal stress allows the brake pads to be engaged quicker and more smoothly, while the wear on the pads is greatly reduced.

In addition, the axial movement between the housing and the supporting cradle isolates the pivoting movement of the caliper unit required to release the braking pressure during the backing, non-braking mode of operation. By thus establishing the pivoting action independently of the in and out movement of the housing to accommodate the relative movement of the braking pads, any tendency toward binding or other stress inducing interaction between the parts is obviated.

It will be realized that the multiple point mounting of the caliper housing on the cradle, and thus distribution of the braking load, not only allows more efficient and reliable operation for trailers of increased axle loading, but also improves the responsiveness, reliability, maintenance record and life expectancy of the braking system on any size trailer. Furthermore, the separation of the in and out movement, and thus isolation of the axial movement of the housing from the pivotal movement of the caliper unit, and vice versa, assures that both functions are carried out smoothly and without interference from the other. Whereas in my previous design, both the in and out and the pivoting movement is accommodated on the single pivot pin, now the two functions are separated. As a consequence both functions are made more efficient, in addition to providing for increased braking capacity, but all without departing from the basic patented concept.

Advantageously, the cradle comprises a yoke mounted on the pivot pin and has spaced arms for substantially embracing the housing of the caliper unit on three sides. An added specific function of the pivot pin is to substantially prevent any axial movement of the yoke along the pin. In the preferred embodiment shown, the pin takes the form of a shoulder bolt with the head and fastening nut performing this function.

To limit the pivoting movement of the caliper unit, stop means is provided on the bracket. A first stop engages the cross piece adjacent one arm for limiting the pivot movement in one direction during release upon vehicle braking, and a second stop on the opposite side is provided for limiting movement during normal vehicle forward movement and braking. The first stop is an elastomeric bumper that biases the caliper unit toward the second stop during normal forward operation.

The spaced arms of the yoke each form a right angle with a cross piece. The proximal end of each arm extends from the cross piece adjacent the point of engagement with the respective stop; the distal end of each arm extending upwardly to snugly engage the sides of the housing.

In accordance with the preferred embodiment, the main guide means on the cradle comprises a guide pin and a corresponding guide aperture on each side of the housing adjacent the distal end of the respective arms. The guide pins thus provide for transfer of force during a braking operation to both arms; whereas, in the past a single arm in the direction of movement of the housing had to absorb the entire force. With the force distributed between at least these two points, the stress on the parts is lessened, and the in and out movement of the housing is smoother and more reliable. To provide for a limited cushioned effect of the movement, an elastomeric bushing is provided around each pin.

In addition to the bushing surrounding the guide pins, an elastomeric spring is provided between the housing and the adjacent arm of the yoke. The spring bodily centers the housing of the caliper unit in the axial direction once the braking pressure is released from the pads. Further, the two springs acting in concert are operative to provide added cushion to the axial movement during the braking mode to absorb shock and prevent clashing of parts during hard braking operations. Advantageously, the bushing and the spring are formed as a single piece to reduce the cost and to provide for more economic assembly.

In addition, I contemplate providing secondary guide means in the form of opposed guide tracks between the cradle and the housing, both adjacent the distal end of the arms and along the cross piece. These additional mounting points in the caliper unit provide even more favorable distribution of the braking force. Both the horizontal loading and vertical loading are accommodated. In effect, the multiple guide points are laid out in a triangle between the guide pins on the cradle arms and the guide track between the cross piece of the cradle and the housing. This arrangement is especially helpful in making sure that the load is even better distributed. Any tendency for skewing of the housing or cocking of the brake caliper unit during operation is eliminated. Not only is the operation of the brake unit improved, but the life span of the brake pads is increased since the brake pads are assured of engagement with the rotor in a substantially flat, full face to face engagement. Preferably, the guide tracks on the distal ends of the arms are formed as inwardly directed hooks; whereas, the guide track on the cross piece of the yoke is formed as a tongue and groove assembly.

While in the preferred embodiment the cradle is fully integrated into the caliper unit, in accordance with other, broader aspects of the present invention such full integration is not necessary. Thus, in accordance with the broadest aspects of the present invention, the yoke of the cradle can be incorporated as simply a pivotal component of a two piece mounting bracket.

The Null's brake system of the present invention also contemplates one brake assembly with a relief valve forming a master to brake one wheel of a trailer, and a slave or follower brake assembly to brake the second wheel. It is preferable to include split common feed and exhaust lines, and a common transfer line in the housing, for supplying/releasing the hydraulic pressure. Upon backing, the flow reverses in the transfer line to release the hydraulic pressure from both cylinders through the exhaust line. The relief valve advantageously includes a flow through valve chamber for the pressure side, and a reciprocal valve member in the chamber to open and close the exhaust side. A separate return transfer line from the brake cylinder is obviated. Upon lifting of the valve element in the relief valve by engagement with an adjustable actuating pad, the pressurized fluid is dumped directly from the transfer line to the common return line. At all times during braking, the brake cylinder of both brake assemblies are assured of being provided with operating pressure.

During the operation of the braking system of the present invention, a master cylinder on the trailer tongue translates the surge of the trailer upon braking by the towing vehicle to generate a hydraulic pressure that is fed through the common feed line to the master brake assembly. The pads engage the rotor for braking of that wheel of the trailer, usually the left front wheel. Each of the additional wheels, such as the right wheel of the trailer and both rear wheels when a tandem axle trailer is being equipped, are simultaneously braked by the slave brake assembly or assemblies.

The hydraulic pressure for the brake cylinder(s) is proportionally generated by the braking action in response to the deceleration of the towing vehicle. For a trailer having a relatively large capacity and/or traveling at high speeds, the braking force generated by the brake pads, and thus the counteracting force that is to be distributed between the several guide means of the caliper unit, is substantially increased. By providing the multiple guide points and arranging them in the triangular pattern represented by the guide pins at the distal ends of the arms and the tongue and groove assembly along the cross piece of the cradle, an even distribution of the forces is provided. Any tendency to distort or overload one component is therefore eliminated. Once the towing vehicle resumes normal forward movement, the piston of each of the brake assemblies returns to its home or release position. The caliper unit of each brake assembly can easily and efficiently self-center itself as to in and out movement along the spaced guide means.

When the towing vehicle is backed, the force along the tongue is translated into hydraulic pressure in the master cylinder, essentially the same as during normal braking. In effect, the tendency toward braking action is initiated. However, the relief valve on the master disc brake assembly is opened by the valve actuator pad allowing the hydraulic fluid to flow back through the single transfer passage and the common exhaust line to the non-pressurized reservoir. With the pressure thus relieved, both brake assemblies are disengaged and the trailer is backed easily.

The valve element within the relief valve assembly proportions the flow to maintain the brake pads in light engagement with the rotor so that the caliper unit is held in the pivoted position until backing is complete. Advantageously, since the pivot pin does not have to accommodate the in and out movement of the housing of the caliper unit, the pivoting action of the caliper unit is smooth and uninterrupted. This feature provides further assurance against intermittent operation or jerking of the trailer during the backing mode.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification, illustrates several aspects of the present invention and together with the description serve to explain the principles of the invention. In the drawings:

FIG. 2 is an overall exploded view of the improved disc brake assembly of the present invention to be used as the master brake assembly, and illustrating the manner for mounting on a trailer hub and the relationship with the brake rotor; it being understood that the slave/follower brake assembly is preferably the same except it does not include a pressure relief valve;

FIG. 3 is a cross sectional view of the disc brake assembly taken along line 3—3 of FIG. 4 with the brake pads in their released or withdrawn position on opposite sides of the brake disc (cut-away view);

FIG. 3A is an enlarged cut-away view of the disc brake assembly of the present invention similar to FIG. 3, but showing the brake pads in engagement with the disc for braking action, and in turn with the housing of the caliper unit shifted from the dashed line to the full line position as the brake pads self-center across the disc;

FIG. 3B is a similar view to that in FIG. 3A but from the opposite side and including a partial cut-away view showing the cushioned movement of the guide pin mounted at the distal end of the arm of the yoke, the relief valve in a position of being actuated and the brake pads lightly engaged;

FIG. 4 is a front view and partially in cross section illustrating the master brake unit and the operation of the disc brake assembly during normal forward movement and braking, and FIG. 4A is a similar view as FIG. 4, but with the caliper unit pivoted through approximately 5° for relief of the pressure during the backing, non-braking mode of operation and inset.

FIG. 4B is an inset view of FIG. 4A showing in greater detail the actuator stop for the relief valve and the resilient bumper forming a first stop for the yoke during the backing/non-braking mode of operation.

FIGS. 4C and 4D are inset views of FIG. 4 showing the arrangement of the guide pins for the caliper unit in greater detail.

Figure 1:
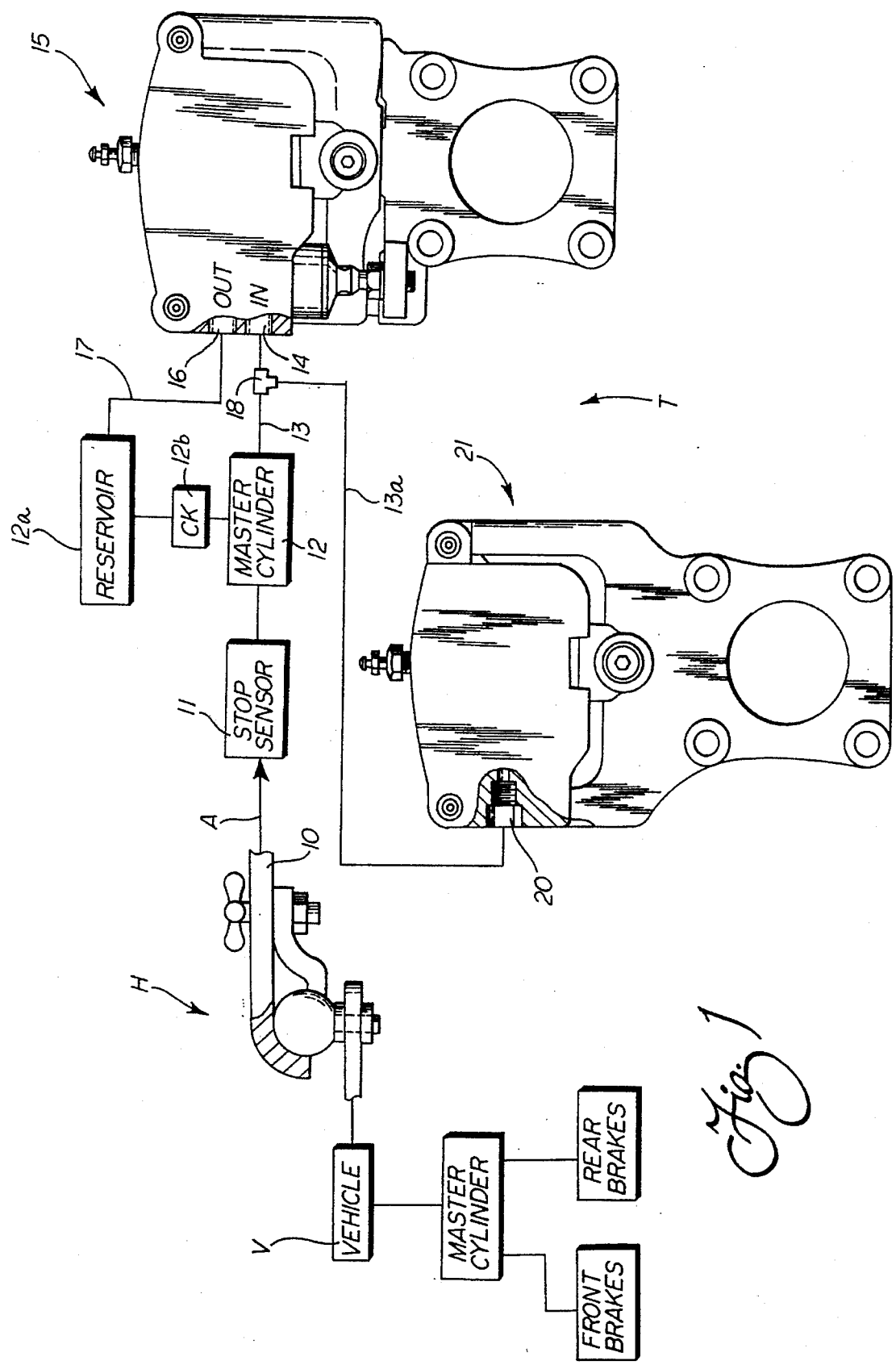
FIG. 1 is a schematic diagram of the braking system set up in accordance with the use of the improved disc brake assemblies of the present invention, and particularly including one master disc brake assembly and one slave or follower disc brake assembly suitable for a single-axle trailer.

Reference will now be made in detail to the present preferred embodiment of the invention, an example of which is illustrated in the accompanying drawings.

DETAILED DESCRIPTION OF THE PREFERRED EMBODIMENT

In the overall schematic view of FIG. 1, a trailer braking system is set up according to the present invention. The particular set up will be recognized as being one for a typical single axle trailer with braking being applied to both wheels. On the far left-hand side of this figure, there is shown in block form a vehicle V incorporating a conventional master cylinder, front brakes and rear brakes (not numbered). On the right-hand side is depicted the trailer, or other towed vehicle, T that may be connected by a conventional ball type hitch H to the towing vehicle V.

As schematically shown in FIG. 1, the trailer T includes a tongue 10 incorporating a stop sensor 11, such as a telescoping joint, and a master cylinder 12 with a piston connected to the sensor 11. As is conventional, the master cylinder 12 includes an integral reservoir 12a and check valve 12b to control the flow of fluid therebetween. As is apparent, when the towing vehicle V slows due to braking, the momentum of the trailer T tends to urge the tongue 10 in the forward direction. A counteracting force, denoted by the action arrow A, is operative to cause the stop sensor 11 to operate the piston of the master cylinder 12 to provide operating pressure.

The pressurized hydraulic fluid from the master cylinder 12 moves through the common feed line 13, which is in turn connected to an inlet coupling 14 of a master disc brake assembly 15, incorporating the important new concepts of the present invention. A more detailed description of the disc brake assembly 15 follows below. An outlet coupling 16 is connected to a common return/exhaust line 17 directly to the reservoir 12a.

For a single axle trailer T with braking action to both wheels, a T coupling 18 is connected to the common feed line 13 providing a branch 13a, which in turn connects to an inlet/outlet coupling 20 on a slave or follower disc brake assembly 21. Thus, the branch line 13a is functionally a part of the common feed line 13. Of course, additional T couplings may be provided on the common feed line for feeding additional slave/follower brake assemblies (not shown) when tandem axles are utilized.

As in my previous design, only a single master disc brake assembly 15 is required in combination with a selected number of slave/follower disc brake assemblies 21. As before, a significant advantage is obtained by making the basic parts of the slave/follower disc brake assembly 21 interchangeable with the master disc brake assembly 15. As can be seen by viewing the similarity of the two assemblies in FIG. 1, the only difference is that a single inlet/outlet coupling 20 is utilized and, as will be further apparent below, no relief valve is necessary.

Proceeding now to FIG. 2, an exploded view of the preferred embodiment of the disc brake unit, including key components of the trailer T, is illustrated. However, the axle and the wheel spindle, as well as the typical roller bearings and necessary spacers, are omitted from illustration in FIG. 2. However, by reference to my prior patents '110 and '120, there is provided sufficient illustration of these components for understanding the manner in which the system works. In particular, a hub 25 (as viewed in FIG. 2) is mounted on the spindle by roller bearings. Washer 26, castle nut 27 and cotter key 28 serve to lock the hub 25 on the threaded end of the spindle in a typical manner. Connected to the mounting studs 25a on the hub 25 is a rotary brake disc 29 that thus forms a portion of the brake unit to which the disc brake assembly 15 is applied.

A stationary mounting bracket 30 is positioned on the axle and mounted by suitable fasteners (also not shown). The bracket 30 includes an upstanding support ear 32 for receiving a separate cradle in the form of a yoke 33 defining spaced support arms 34, 35. A pivot pin, in the form of a shoulder bolt 36, extends through mated apertures in the cross piece 37 and the ear 32 of the support bracket 30. The cross piece 37 includes a mounting recess 38 to accommodate the ear 32. The bolt 36 is supported in a metal bushing (such as brass) for free pivoting movement. It is locked in place by a suitable lock washer and nut combination 38. As shown in FIG. 3, the interacting head of the bolt 36 and the nut/washer 40 and the juxtaposed surfaces serve to form a limit means to substantially prevent axial movement of the cradle/yoke 33 along the bolt 36.

In accordance with an important feature of the preferred or first embodiment of the present invention, the cradle/yoke 33 forms a part of a caliper unit, generally designated by the reference numeral 40, and which includes a housing 43 with a bore forming a brake cylinder 44. Positioned in the cylinder 44 is a sealing O-ring 45, a piston 46 and a dust seal/guide ring 47 (see also FIG. 3). The housing 43 of the caliper unit 40 of the disc brake assembly 15 includes a first section with brake pad 48 including a U-shaped guide plate 48a that extends around the top of the housing 43 and within an inset for the cylinder 44. A second section 49 in the form of a plate includes a second brake pad 50. Suitable fasteners 51 (only one shown) connect the first section of the housing 43 with the second section 49.

The pads 48, 50 engage opposite faces of the brake rotor 29. As will be apparent, in the non-braking mode, such as illustrated in FIG. 3, the pads 48, 50 are slightly spaced from the rotor 29. However, once the hydraulic pressure is applied through the master cylinder 12 of the brake unit, as illustrated in FIG. 1, the piston 46 shifts the pad 48 and the housing 43 in opposite directions so that the pads 48, 50 self-center and engage the rotor 29 with the braking force, as illustrated by the action arrows $B_1$, $B_2$, in FIGS. 3A and 3B. As will be seen more in detail below, the shifting of the housing 43 in accordance with action arrows $B_1$, $B_2$ is carried out independently of the pivoting action of the caliper unit 40 including the cradle/yoke 33 and the housing 43, which will now be described in further detail.

Specifically, the cradle/yoke 33 and the housing 43 fit together in such a manner as to form the caliper unit 40 that operates in a unique manner. The caliper unit 40 pivots on the bolt 36 in response to the backing, non-braking mode of operation. As is thus apparent, the in and out movement of the housing 43 is isolated from the pivoting action of the cradle/yoke 33 that supports the housing 43. Because of the isolation, the axial movement in the direction of the vehicle axle for accommodating the engagement of the brake pads 48, 50 cannot in any way interfere with the pivoting action that is provided to relieve the braking action during backing. This in large measure is the feature that allows the present invention to operate with larger capacity trailers so as to provide overall superior performance. At the same time, the main components of the system are not so significantly changed to increase the cost of fabrication or assembly, so that this improved braking system maintains its favorable overall cost of manufacturing, as well as the very low maintenance requirements.

It is important to note that the cradle/yoke 33, by being mounted for pivoting action on the single bolt 36 by the cross piece 37 (FIGS. 3 and 3A) cannot move axially. In other words, as mentioned above, the head of the bolt 36 and the lock washer/nut 40, and the mating guide surfaces, specifically prevent any significant axial movement. In other words, only pivotal movement of the cradle/yoke 33 is permitted, in contrast to my previous basic approach.

Thus, a significant improvement feature of the present invention is the manner in which the caliper unit including the cradle/yoke 33 and the housing 43 is mounted for pivoting movement, but is isolated from the axial, in and out sliding movement of the housing 43 alone (FIGS. 3A, 3B). In other words, the pivoting action on the single pivot pin or bolt 36, while occurring at the same time as the axial movement of the housing 43 within the cradle/yoke 33, is provided independently or separately.

The in and out sliding movement is advantageously guided by multiple point mounting and guide means so that there is even more stable and controlled movement. The multiple point contacts distributes the load to several component parts, not just a single arm of the yoke. The component parts providing the sliding movement are also cushioned, and spring action is provided for self-centering action of the caliper unit 40 with respect to the rotor 29 during operation, as will now be seen more in detail.

Specifically, the braking load is absorbed within the caliper unit by a composite guide means, which includes spaced guide pins 53, 54 (only one shown in FIG. 2). The pins are attached in threaded holes at the distal ends of the arms 34, 35, respectively. In turn, the guide pins in order to accommodate the required axial movement, extend through corresponding apertures 55, 56 within which are positioned elastomeric bushings 57, 57a (see FIGS. 4, 4A, 4C, 4D, and shown broken away in FIG. 2).

These two spaced guide pins 53, 54 assure that the housing 43 can move in and out smoothly, but more importantly, under increased brake loading that might be provided by larger trailers and/or more severe braking, distributing the load to the two arms 34, 35, rather than one. This arrangement relieves any chance of inordinate stress being transmitted. Indeed, the sliding action of the guide pins 53, 54 allows the brake pads 48, 50 to have a more controlled and smoother response.

In addition, the guiding function in this manner, which is separate from the pivoting action on the bolt 36, minimizes any chance of the forces cross acting against each other. This reduces the tendency for skewing or cocking of the caliper unit 40, especially during severe or panic braking. At the same time, distributing the load in this manner eliminates any tendency for the pads 48, 50 to stick as they are moved in and out with respect to the brake disc 29. Further, this feature greatly reduces the wear on the pads 48, 50 since they are assured of flat, full face-to-face engagement.

As indicated briefly above, the elastomeric bushings 57 provided around each of the pins, provides limited cushioned effect to the guide movement. The friction within the bushings 57a, in effect allows the pins 53, 54 to move in a controlled, rather than a jerking manner. They provide needed cushioning to the axial, as well as limited transverse movement during the braking mode to absorb shock and prevent clashing of the parts, especially during hard braking operations. In addition, elastomeric springs 58, as illustrated in FIG. 2, as well as in FIG. 3B, positively bias the housing 43 away from the arms 34, 35. Preferably, each spring 58 and the corresponding bushing 57, 57a are formed integrally, as shown in FIG. 3B. By being formed integrally the most favorable manufacturing and installation cost is obtained.

In addition, it has been found desirable to introduce into the caliper unit 40, secondary guide means in the form of spaced guide tracks 59, 59a. First, as illustrated in FIG. 2, and FIGS. 4C and 4D, the distal ends of the arms 34, 35 are formed as hooks 34a and 35a. These hooks are precision machined to form guide surfaces on the inside and the underneath side. The tracks can take the form of axially extending shoulders that are machined to match the guide surfaces on the hooks. The outside guiding faces of the housing 43 are also machined to match guiding surfaces on the hooks 34a, 35a (see FIGS. 2 and 4).

As will be apparent, as the machined bottom/inside edges of the hooks 34a, 35a engage the mating upper/outside machined edges of the shoulders 59a, 59b and the sides of the housing 43, additional points of load bearing contact is provided. Braking forces in both the horizontal and vertical directions are distributed, and in effect dissipated by these innovative guide means. Of course, these components are fabricated of corrosive proof metals, thus allowing free movement over the life of the braking system.

Thus, as the housing 43 moves in and out/axially, that is in the direction of the axle of the trailer T, any tendency for vertical skewing or twisting within the caliper unit 40 is alleviated. In other words, these additional mounting points in the caliper unit provide still more favorable distribution of the braking force.

In addition, the cross piece 37 of the cradle/yoke 33 is provided with another guide track in the form of a tongue 60 (see FIGS. 2 and 4) mated with a corresponding groove 61 in the bottom of the housing 43. This tongue and groove assembly 60, 61 thus provides additional vertical, as well as horizontal guiding action during the in and out movement generated by the operation of the brake pads 48, 50.

With specific reference now to FIG. 4 of the drawings, the disc brake assembly 15 is illustrated from the perspective of inside the rotor 29 and the wheel, or generally in the opposite direction from that shown in FIG. 2. The illustration in FIG. 4 is with the disc brake assembly 15 positioned when the trailer T is assumed to be in normal forward movement, and with the rotor 29 turning in the clockwise direction, in accordance with the action arrow C. It will be understood that the illustration in this figure is such that the position of the assembly 15 is the same in forward motion for either normal braking or non-braking.

The hydraulic fluid flows through the common feed line 13 extending from the master cylinder 12 through the coupling 14 and past a relief valve, generally designated by the reference numeral 70. A through passage chamber 71 connects to a common transfer line or passage 72 in the housing 43. As illustrated, when the relief valve 70 is in the position shown in FIG. 4, the flow of pressurized fluid is thus provided to the brake cylinder 44 so that braking action may be applied by the brake pads 48, 50 (see FIGS. 3A & 3B). Advantageously, the housing 43 shifts axially, is guided by spaced guide means and self-centers, as described above. This is denoted by the action arrows $B_1$, $B_2$ in these figures. The guide means is provided through the guide pins 53, 54 on both sides of the cradle/yoke 33, as well as by the additional guide tracks 59a, 59b, 60, 61, as previously described. The triangular pattern of these points assures full stability and free sliding movement.

When the caliper unit 40 is in the position of FIG. 4, the cross piece 37 is engaged on one side adjacent the arm 34 by a first stop, namely an elastomeric bumper 72, but on the other side adjacent the arm 35 by a second rigid stop 73. Advantageously, the caliper unit 40 in this second position is thus held secure and steady. The bumper 72 has sufficient compressive memory to keep the caliper unit firmly pivoted and fixed against the stop 73 during normal, forward movement. There is no unwanted periodic lifting off of the stop 73, which could cause uneven braking.

The valve 70 also includes a valve body 75, threaded into a bore of the housing 43 forming the chamber 71. A valve sleeve 75a, as shown in FIG. 4 (also see FIG. 2) mates with the bore. A two piece valve element 76, 76a is adapted for up and down motion in the sleeve to either allow passage of fluid directly through the chamber 71, and through the transverse ports of the sleeve 75a, or to divert and release the pressurized hydraulic fluid through the common return or exhaust line 17. At the top of the valve element 76a is a head 77 that engages a seat on the top of the sleeve 75a so as to be operative to provide the desired relief flow. As is apparent, the valve element 76, 76a is maintained in the downward or closed position by a spring 78 for normal forward movement of the trailer T, and in readiness for braking.

With reference to FIG. 4A, an actuator stop 90 is positioned on a mounting ear 91 of the bracket 30; the stop 90 being positioned in alignment for engagement with the valve element 76. An elastomeric protective cup 92 is provided around the valve body 75.

In operation, as the trailer T is backed by the vehicle V, it will be realized that the tongue 10 is forced back, activating the sensor 11 and actuating the master cylinder 12 (see FIG. 4A). As the brake pads 48, 50 engage the rotor 29, the frictional engagement starts to pivot the caliper unit 40 away from the second stop 73. This occurs since the backing provides counter clockwise rotation of the rotor 29, as designated by the action arrow D in FIG. 4a. As the pivoting of the caliper unit 40 continues, the elastomeric bumper forming the first stop 72 is compressed, as illustrated best in this figure, and in particular in the inset view of FIG. 4C. With the pressure relieved in this manner, both the master brake assembly 15 and the slave/follower brake assembly 21 are disengaged and the trailer T is backed easily.

The valve element 76, 76a is particularly adapted for proportioning the flow to maintain the brake pads 48, 50 in light engagement with the rotor 29 so that the caliper unit 40 is maintained in the pivoted position about the bolt 36 until the backing is complete. It is very important that since the pivot bolt 36 does not have to accommodate the axial or in and out movement of the housing 43, but instead this function is accommodated in an isolated fashion, the pivoting action as represented in this FIG. 4A is smooth and uninterrupted.

Also when the backing is complete, the compressive force built up in the bumper 72 is sufficient to immediately return the caliper unit 40 to its position engaging the second stop 73 (see FIG. 4). Once the trailer T then resumes forward motion, with the disc 29 traveling in the direction C, the brake unit operates in a normal fashion. The elastomeric bumper 72 with its built in compressive force memory, maintains the firm engagement of FIG. 4 in all conditions except for the backing/non-braking.

When braking is initiated, with the caliper unit 40 so pivoted against the stop 73, the pressurized hydraulic fluid generated in the master cylinder 12 travels in the direction of the flow arrows in FIG. 4. The piston 46 in turn is actuated, the pads 48, 50 firmly engage the disc 29 and braking is effective.

In summary, a unique improvement is provided in several different respects by the brake unit of the present invention. The caliper unit 40 is designed to include guide pins 53, 54, as well as guide tracks 59a, 59b and 60, 61 for isolating axial movement of the housing 43, thus isolating the pivoting action provided by the pivot bolt 36. By allowing independent pivoting movement of the caliper unit 40, more efficient operation is obtained. Any skewing or cocking of the housing 43, particularly under severe or panic braking, is eliminated. Furthermore, since the support for the braking forces are distributed at the multiple point mountings, any undue stress is relieved. Increased axial loads for larger trailers, and to accommodate more severe braking is thus a key benefit of the brake unit of the present invention.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as is suited to the particular use contemplated. For example, in a second embodiment a modification is envisioned where an alternative, equivalent power means, such as an electrical linear motor system, could be utilized in lieu of the hydraulic system. All such modifications and variations are within the scope of the invention as determined by the appended claims when interpreted in accordance with breadth to which they are fairly, legally and equitably entitled.

I claim:

1. A brake unit including a disc brake assembly having brake pads for mounting on the axle of a trailer or other towed vehicle for stopping during forward movement and to provide release of the brake pads from firm braking engagement with a rotor upon backing comprising:

a stationary mounting bracket for attachment to the vehicle for supporting the disc brake assembly;

a hydraulic means for moving the pads into and out of engagement with the rotor in response to the presence and release of hydraulic pressure for forward braking and backing non-braking modes of vehicle operation, respectively;

a caliper unit including a housing for mounting said pads for relative movement toward and away from said rotor and into and out of engagement therewith;

said hydraulic means including a piston within a brake cylinder in said housing in operative engagement with at least one of said pads to provide relative movement;

said caliper unit further including a cradle with guide means for securely supporting said housing for axial movement in response to the relative movement of said pads during the braking mode;

pivot means for independently mounting said cradle on said bracket for pivoting movement of said caliper unit in response to the rotor movement upon backing, whereby multiple point mounting of said housing on said cradle distributes the braking load and isolates axial movement of said housing from the pivotal movement of said caliper unit to provide efficient braking during forward movement and during release upon backing.

2. The brake unit of claim 1, wherein said pivot means for pivoting movement of said caliper unit comprises a single pivot pin, said cradle including a yoke mounted on said pin and having spaced arms for receiving and substantially embracing said housing, stop means on said bracket for restricting said pivoting movement of said caliper unit to provide additional stability and limit means on said pin to substantially prevent axial movement of said yoke along said pin.

3. The brake unit of claim 2, wherein said yoke includes spaced arms each substantially forming a right angle with a cross piece, the proximal end of each arm extending from the cross piece adjacent said pivot pin to a distal end along opposite sides of and embracing said housing;

said stop means comprising a first stop on said bracket engaging said cross piece adjacent one arm for limiting pivot movement in one direction during release upon vehicle backing; and a second stop on the opposite side of said bracket engaging said cross piece adjacent the other arm for limiting movement in the opposite direction during vehicle forward movement.

4. The brake unit of claim 3, wherein said guide means on said cradle includes a guide pin and a corresponding guide aperture on each side of said housing adjacent the distal end of the respective arms to allow smooth in and out movement of said housing.

5. The brake unit of claim 4, wherein each of said guide pins is mounted on the distal end of said arms and engage mating apertures in said housing, and an elastomeric bushing around said pins for cushioned movement of said housing during braking.

6. The brake unit of claim 5, wherein is further provided an elastomeric spring fitted around each guide pin between said housing and the distal end of the adjacent arm of said yoke to bodily center said housing in the axial direction during the non-braking modes and to provide added cushion to the axial movement during the braking mode.

7. The brake unit of claim 6, wherein said elastomeric bushing fitted around each guide pin and said spring are formed as one piece.

8. The brake unit of claim 4, wherein said guide means further includes opposed guide tracks on said cradle and said housing adjacent the distal end of said arms and said cross piece, whereby to provide additional mounting points in said caliper unit for distributing the braking load.

9. The brake unit of claim 8, wherein said guide tracks are formed by an inwardly directed hook on the distal end of each arm engaging an axially extending shoulder on said housing and a tongue and groove between said cross piece and said housing.

10. The brake unit of claim 3, wherein said first stop includes an elastomeric bumper having sufficient compressive force memory to maintain said caliper unit in engagement with said second stop during vehicle forward movement including in the braking mode.

11. A braking system including at least one disc brake assembly as defined in claim 1, and in combination further comprising:

a relief valve for release of the hydraulic pressure on said piston to provide the backing non-braking mode;

actuating means for operating said valve in response to said independent pivoting movement of said caliper unit; and said hydraulic means including a pressure source and reservoir, a feed line and a return line to and from said cylinder, respectively, said relief valve being operable by pivoting of said caliper unit to allow flow through said return line to said reservoir for relieving the hydraulic pressure during vehicle backing.

12. The braking system of claim 11, wherein said vehicle includes at least two wheels, said brake assembly with said relief valve forming a master assembly for braking one wheel, a slave brake assembly according to claim 1 for braking the second wheel, said hydraulic means including a common feed line for supplying hydraulic pressure to the brake cylinders of both assemblies, said relief valve being operative through a common exhaust line to relieve the hydraulic pressure to both cylinders.

13. The braking system of claim 12, wherein said relief valve comprises a valve chamber communicating with said feed and exhaust lines, and a reciprocal valve member sealed in said chamber to open and close said exhaust line, and a common transfer line exposed to operating pressure in said feed line at all times through said valve chamber and to said exhaust line when said valve is actuated during the backing non-braking mode.

14. A brake unit including a disc brake assembly for a trailer or other towed vehicle to provide release of the brake pads from firm braking engagement with the rotor upon backing comprising:

a stationary bracket for attachment to the vehicle for supporting the disc brake assembly;

power means for moving the pads into and out of engagement with the rotor in response to forward braking and non-engagement with the rotor in response to forward braking and non-braking modes of vehicle operation, respectively;

a caliper unit including a housing for mounting said pads for relative movement toward and away from said rotor and into and out of engagement therewith;

said power means including moving means in said housing in operative engagement with at least one of said pads to provide said relative movement;

said caliper unit further including a cradle with guide means for securely supporting said housing for axial movement in response to the relative movement of said pads during the braking mode;

pivot means for independently mounting said cradle on said bracket for pivoting movement of said caliper unit in response to rotor movement upon backing; and means to release the firm braking engagement of the brake pads with the rotor in response to said pivoting movement for non-braking during backing, whereby said braking system is effective to provide efficient braking during forward movement and automatic release upon backing.

15. The brake unit of claim 14, wherein is further provided actuating means for operating said release means.

16. The brake unit of claim 15, wherein said power means is a self-contained hydraulic system and said release means is a relief valve for the hydraulic pressure in said system operable in response to said pivoting movement.

17. The brake unit of claim 14, wherein said pivot means for pivoting movement of said caliper unit comprises a single pivot pin, said cradle including a yoke mounted on said pin and having spaced arms for receiving and substantially embracing said housing, stop means on said bracket for restricting said pivoting movement of said caliper unit to provide additional stability and limit means on said pin to substantially prevent axial movement of said yoke along said pin.

18. The brake unit of claim 17, wherein said guide means on said cradle includes a guide pin and a corresponding guide aperture on each side of said housing adjacent the distal end of the respective arms to allow smooth in and out movement of said housing, an elastomeric busing provided around said guide pins for cushioned movement of said housing during braking.

19. The brake unit of claim 18, wherein is further provided an elastomeric spring fitted around each said guide pin between said housing and the distal end of the adjacent arm of said yoke to bodily center said housing in the axial direction during the non-braking modes and to provide added cushion to the axial movement during the braking mode.

20. The brake unit of claim 14, wherein pivot means for pivoting movement of said caliper unit comprises a single pivot pin, said cradle including a yoke mounted on said pin and having spaced arms for receiving and substantially embracing said housing, stop means on said bracket for restricting said pivoting movement of said caliper unit to provide additional stability and limit means on said pin to substantially prevent axial movement of said yoke along said pin;

said yoke including spaced arms each substantially forming a right angle with a cross piece, the proximal end of each arm extending from the cross piece adjacent said pivot pin to a distal end along opposite sides of and embracing said housing;

said guide means further including opposed guide tracks on said cradle and said housing adjacent the distal end of said arms and said cross piece;

said guide tracks being formed by an inwardly directed hook on the distal end of each arm engaging an axially extending shoulder on said housing and a tongue and groove between said cross piece and said housing.

* * * * *